Patented Oct. 27, 1936

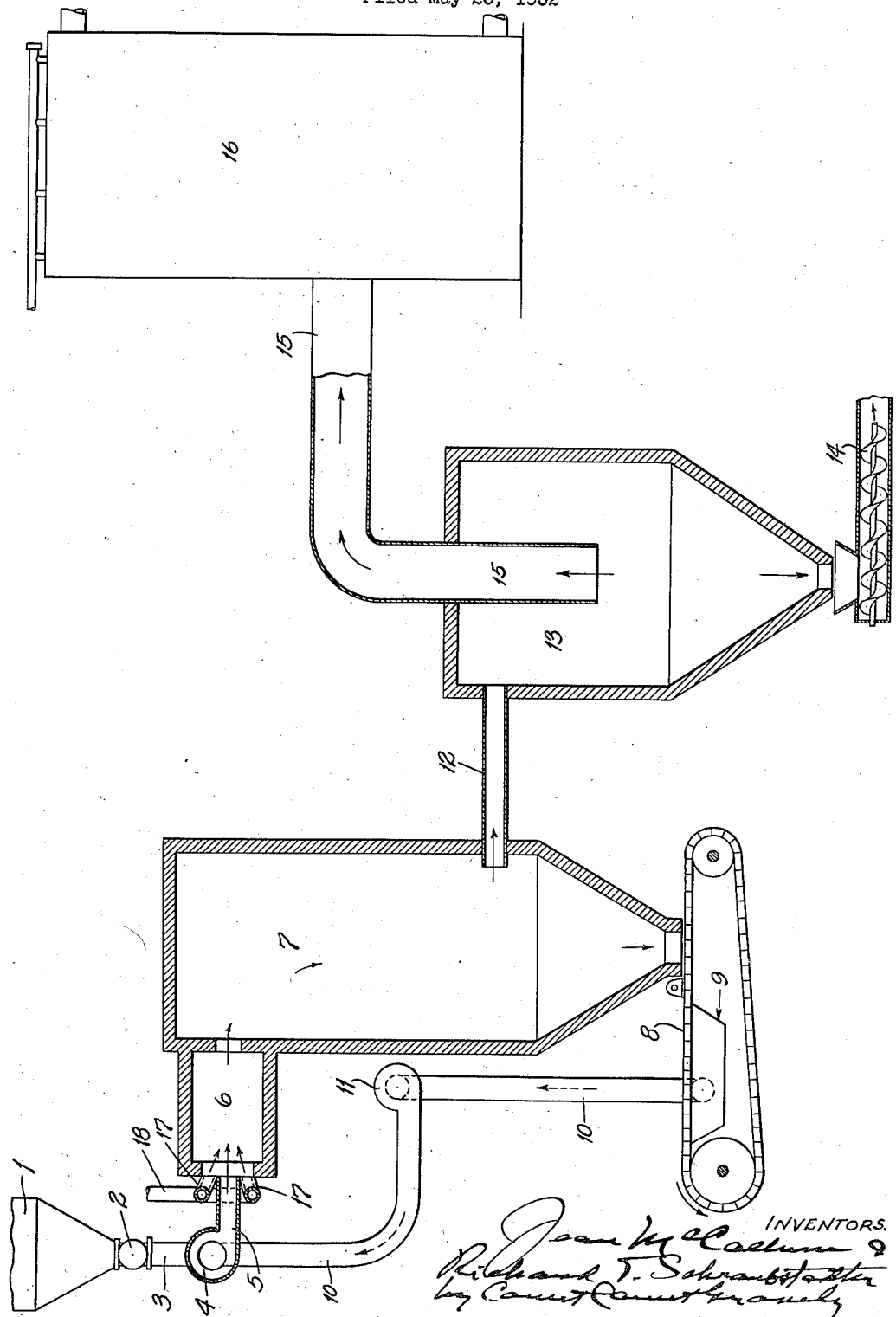

2,058,480

UNITED STATES PATENT OFFICE 2,058,480

PROCESS OF TREATING PYRITES

Jean McCallum, Ferguson, and Richard T. Schraubstadter, University City, Mo., assignors to St. Louis Smelting and Refining Company, St. Louis, Mo., a corporation of Missouri Application May 23, 1932, Serial No. 613,023

5 Claims. (Cl. 23—224)

Our invention relates to the treatment of pyrites and has for its principal object to devise a simple and economical process by which the sulphur content of the pyrites can be recovered as elemental sulphur and the iron content can be recovered in the form of oxides or other readily available form. The invention consists principally in burning finely divided pyrites in suspension in an oxidizing current containing somewhat less oxygen than necessary for complete oxidation of the sulphur and iron content of the pyrites, removing most of the solid matter from said current and treating the gaseous matter in the presence of the remaining solids in a reducing atmosphere at a temperature above the condensing point of sulphur vapor. It also consists in the steps and operations hereinafter described and claimed.

The accompanying drawing shows more or less diagrammatically an apparatus adapted for carrying out our process.

According to the present invention, pyrites is finely ground, preferably to dust or such fineness that the particles thereof can be readily carried in suspension by the air. This finely divided pyrites is continuously blown by a blast or blasts of air into the upper portion of a combustion chamber where it is burned while still in suspension. The quantity of oxygen is controlled so as to be somewhat less than that required for complete oxidation of the pyrites. The current passes out of the oxidation chamber into a second chamber, hereinafter called the reducing chamber, from which oxygen is excluded and which is kept at a temperature above the point at which sulphur vapor condenses.

Under the conditions prevailing in the combustion chamber, some of the pyrites ($FeS_2$) remains unchanged, some of it is changed to iron sulphide (FeS), and the greater portion is decomposed into iron oxides (FeO, $Fe_2O_3$, $Fe_3O_4$), sulphur dioxide ($SO_2$) and elemental sulphur (S). As sulphur dioxide is a gas, and the sulphur a vapor, they pass into the reducing chamber. The iron compounds, however, are solids; and the greater portion of the iron compounds are readily separated out of the current or draft before such draft enters the reducing chamber; a relatively small portion of iron oxides and iron sulphides is carried along with the sulphur dioxide and sulphur into the reducing chamber.

In the combustion chamber, both sulphides of iron ($FeS_2$ and FeS) react with sulphur dioxide ($SO_2$), thereby producing free sulphur (S) and ferrosoferric oxide ($Fe_3O_4$) along with other oxides of iron. The reaction is rapid and complete, being catalytically accelerated by the ferrosoferric oxide and probably also by the ferric oxide ($Fe_2O_3$). It is noted that some of the catalytic agent, ferrosoferric oxide, is formed in the combustion chamber and carried over into the reducing chamber; but it is also one of the direct products of the very reaction which is accelerated by the presence of ferrosoferric oxide. In the reduction chamber any sulphur dioxide present is reduced to elemental sulphur and any iron sulphide is converted into iron oxide and sulphur, aided by the presence of ferrosoferric oxide.

As stated above, the temperature of the reducing chamber is kept above the point at which sulphur vapor condenses that is, above 445 degrees centigrade. Under the conditions prevailing in the reducing chamber, the reactions are such that the sulphur dioxide remaining is deprived of its oxygen and the elemental sulphur thereby produced (along with that previously produced in the combustion chamber) pass off in gaseous form into a suitable cooling and collecting chamber or chambers wherein it is cooled below the temperature at which sulphur vapor condenses and is deposited in the form of flowers of sulphur.

As stated above, the draft continues from the reduction chamber to suitable cooling and depositing chambers where the sulphur is deposited, usually in the form of flowers. The iron compounds present in the reducing chamber after deoxidation of the sulphur are almost wholly deposited at the bottom of the reducing chamber in the form of oxides substantially free from sulphur and also substantially free from phosphorus, because most pyrites, as found in nature, are almost wholly free from phosphorus. The iron compounds deposited in the combustion chamber contain some sulphur; and to eliminate this sulphur, such iron compounds, which are mostly various oxides of iron, are treated in a sintering machine and then reduced, as by smelting in a blast furnace or in an electric furnace.

In carrying out our process, the initial ignition of the charge in the combustion chamber may be effected in any convenient way, as by the flame of a torch or an electric spark. After such initial ignition, no extraneous heat is required, as the reaction of the oxygen with the pyrites is very active and produces intense heat.

The present process contemplates that the draft will carry into the reducing chamber enough sulphides of iron to bring about reduction of the sulphur dioxide. This quantity may be controlled in the first instance by properly proportioning the quantity of pyrites in the charging blast with relation to the volume of oxygen in such blast; and a proper control can be readily ascertained by taking samples of the product at different points along the draft. In case of a deficiency of iron sulphides in the reducing chamber to react with the oxygen of the sulphur dioxide, additional pyrites or iron sulphide may be injected directly into the reducing chamber to compensate for such deficiency.

The accompanying drawing represents apparatus suitable for the practice of our process. Said apparatus comprises a hopper bottom bin 1 for the pulverized material, a feeder 2 in the outlet thereof for feeding and measuring the material into a flue 3 which leads into a blower 4 which has also an air inlet and wherein the air (or air and steam) and materials are thoroughly mixed. From said blower an outlet flue 5 leads horizontally into a combustion chamber 6 which opens into the upper portion of a vertically disposed cylindrical chamber 7, hereinafter called a reaction chamber, which has a hopper bottom opening onto the conveyor 8 of a sintering machine 9, from which a flue 10 leads through a blower 11 back to said blower 4. From the lower portion of the cylindrical reaction chamber 7 a flue 12 leads horizontally into the upper portion of a second vertically disposed cylindrical chamber 13, hereinafter called the reducing chamber, which also has a hopper bottom disposed above a screw conveyor 14. A centrally located flue 15 extends upwardly from the lower part of said chamber 13 and opens into a cooling and collecting chamber 16 provided with suitable outlets at top and bottom.

Surrounding the delivery flue 5 of the blower 4 is a ring of burner jets 17 that are connected by supply pipe 18 to a suitable source of fuel supply, preferably gas, powdered coal, or powdered coke. These burners furnish the heat necessary for initiating the process, after which they may be shut off.

In carrying out our process with such apparatus, the general operation is as follows. The burners 17 at the inlet to the combustion chamber are lit, after which the feeder 2 and the blower 4 are adjusted to proportion and project a blast of pulverized material and air in proper proportions into the combustion chamber. On account of the very fine state of division of the pyrites and the intimate contact of the oxygen therewith, the effect of the heat is to decompose the pyrites ($FeS_2$) with almost explosive violence into iron sulphide (FeS) and free sulphur (S). If there is an excess of oxygen beyond that of free sulphur, the latter immediately reacts with oxygen to form sulphur dioxide ($SO_2$). The newly formed iron sulphide (FeS) is in a very porous and spongy condition which adapts it for participation in subsequent reaction. The end reactions of the process are exothermic; and after the process has been well started, the burners are shut off.

From the combustion chamber 6, the current passes into the upper portion of the reaction chamber 7 wherein the reactions begun in the combustion chamber are continued and supplemented. In this reaction chamber, there is reaction between the newly formed and spongy iron sulphide (FeS) and the newly formed sulphur dioxide ($SO_2$) whereby much of the oxygen of the sulphur dioxide displaces much of the sulphur of the iron sulphide, with resulting production of iron oxides and elemental sulphur. Among the products of such reaction is ferrosoferric oxide ($Fe_3O_4$) which highly activates the reaction described after the manner of a catalyst. Thus, the catalytic agent is autogenetically and continuously formed where it is most useful in carrying out the process.

The iron, mainly in the form of oxides, and other solids pass through the bottom of the reaction chamber to the sintering machine 9, and thence to the reducing furnace, where it is recovered in the form of metal. The gaseous matter passes to the reducing chamber 13, which is kept at a temperature above the condensing point of sulphur vapor and wherein the reducing action begun in the reaction chamber is continued and there is further separation of the solids by deposit thereof on the conveyor 14. Sulphur vapor passes through the flue 15 to the cooling and collecting chamber 16 where it is recovered.

One of the great merits of our process is that, after the action is initiated, the reactions generate the heat required to maintain and continue the action. For instance if it is assumed that the iron of the pyrites is oxidized without any oxidation of the sulphur, the reactions and production of calories, which may occur, will be as set forth in Table I as follows:

Table I $2FeS_2 + \text{heat} = 2FeS + 2S$ absorbing 25,100 calories.

$2FeS + 3O = Fe_2O_3 + 2S$ releasing 145,500 calories.

$3FeS + 4O = Fe_3O_4 + 3S$ releasing 196,850 calories.

$2FeS_2 + 3O = Fe_2O_3 + 4S$ releasing 120,400 calories.

$3FeS_2 + 4O = Fe_3O_4 + 6S$ releasing 159,200 calories.

Again, it is a great merit of our process that it affords wide control over the oxidation of the pyrites by adjustment of the charge of material and air blast with respect to each other. When the adjustment is such as to promote the complete oxidation of the iron, the following reactions may take place in the various zones of the combustion and reaction chambers:

Table II $2FeS_2 + 7O = Fe_2O_3 + SO_2 + 2S$ releasing 259,000 calories.

$2FeS_2 + 11O = Fe_2O_3 + 4SO_2$ releasing 397,600 calories.

$2FeS + 7O = Fe_2O_3 + 2SO_2$ releasing 284,100 calories.

$4FeS + 3SO_2 = 2Fe_2O_3 + 7S$ releasing 83,100 calories.

$4FeS_2 + 3SO_2 = 2Fe_2O_3 + 11S$ releasing 32,900 calories.

Although $SO_2$ is ordinarily a reducing agent when an excess of oxygen or other oxidizing agent is present, it becomes an oxidizer for FeS and $FeS_2$ during our reaction stages where the amount of available oxygen is definitely limited or controlled and where the temperature is regulated to promote the desired reactions.

Whenever it becomes expedient to further restrict the oxidizing tendency, the following reactions may be brought about:

Table III $3FeS + 2SO_2 = Fe_3O_4 + 5S$ releasing 58,250 calories.

$3FeS_2 + 2SO_2 = Fe_3O_4 + 8S$ releasing 20,600 calories.

$2FeS + 2Fe_2O_3 + SO_2 = 2Fe_3O_4 + 3S$ releasing 33,400 calories.

$4Fe_2O_3 + FeS = 3Fe_3O_4 + S$ releasing 8,500 calories.

In certain zones, ferrosoferric oxide may be produced, as above indicated, which is further oxidizable as follows:

*Table IV*

$4Fe_3O_4 + SO_2 = 6Fe_2O_3 + S$ releasing 16,300 calories.

$Fe_3O_4 + SO_2 + FeS = 2Fe_2O_3 + S$ releasing 24,850 calories.

When using auxiliary fuel, such as oil, gas or powdered coke, a considerable quantity of water is produced by combustion. At other times it may be expedient to introduce water vapor either as steam or by other means. When such vapor is present and adjustments are properly made in the apparatus, the following reactions occur:

*Table V*

$2FeS + O + 2H_2O = Fe_2O_3 + 2H_2S$ releasing 35,500 calories.

$2FeS_2 + O + 2H_2O = Fe_2O_3 + H_2S + S$ releasing 15,300 calories.

$2FeS + 3H_2O = Fe_2O_3 + 2S + 6H$ absorbing 27,900 calories.

$2FeS_2 + 3H_2O = Fe_2O_3 + 4S + 6H$ absorbing 55,000 calories.

$2H_2S + SO_2 = 2H_2O + S$ releasing 36,800 calories.
$2H_2S + O_2 = 2H_2O + 2S$ releasing 105,100 calories.
$4H + SO_2 = 2H_2O + S$ releasing 46,300 calories.

From the foregoing it is evident that ample heat is provided by the almost complete conversion of the iron to oxide and the intermediate and partial oxidation of the sulphur to supply the heat needed for endothermic reactions, and this fact exemplifies one of the novel features of our invention, namely, that at will any desired portion even to the extent of virtually all of the sulphur is recoverable in the form of elemental sulphur by means of the proper control of the exothermic reactions involved.

The almost instantaneous action of oxidation to which the minute particles of pyrites are subjected in the first stage, leaves them in a very porous and permeable condition and it is to such physical condition that the catalytic or activating action is largely due. In fact, certain catalytic agents, such as sponge platinum for example, depend virtually upon this spongy porous nature to function and thus with an exceedingly large exposed surface and the porous nature of each particle of catalyst or activator our process provides an activated atmosphere unlike any heretofore devised.

Although there is eminent authority to term the spongy and porous iron oxides catalysts, we prefer to call them "actuators" and henceforth in this text the term actuator signifies any substance essentially derived from the material in process, which accelerates reaction at some stage or stages of that process, whether the substance is of the nature of catalyzer which does not (or apparently does not) undergo change, or whether it is subject to such conditions that, at some stage or stages of that process, it participates in the chemical reactions to the extent of changing, whether permanently, wholly, temporarily, or in part.

Because it is the iron compounds present in, or derived from, pyrites, which possess the important actuating properties above mentioned, the chemical reactions of the iron sulphides and oxides have been stressed, for it is evident that the conversion of any other mineral constituent of pyrites from its sulphide state to that of oxide is an exothermic reaction and any incidental sulphur dioxide thus produced is reducible to sulphur by the actuating action of the iron compounds.

What we claim is:

1. The process which comprises burning pulverized pyrites in suspension in a controlled atmosphere and autogenetically forming a porous oxide of iron catalytic agent which promotes the reduction to elemental sulphur of the sulphur compounds, the quantity of such autogenetically formed catalyst bearing a more or less fixed ratio to the quantity of pyrites burned and settling out the greater portion of the solid matter and passing the gaseous matter with the remaining solid matter suspended therein into a reducing atmosphere, maintained at a temperature above the condensing temperature of sulphur vapor, again separating out the solid matter and cooling the gaseous matter to or below the temperature at which sulphur vapor condenses.

2. The process which comprises burning pulverized pyrites in suspension in a controlled atmosphere and autogenetically forming a porous oxide of iron catalytic agent which promotes the reduction to elemental sulphur of the sulphur compounds, the quantity of such autogenetically formed catalyst bearing a more or less fixed ratio to the quantity of pyrites burned and settling out the greater portion of the solid matter and passing the gaseous matter, with the remaining solid matter suspended therein, along with water vapor, into a reducing atmosphere, maintained at a temperature above the condensing temperature of sulphur vapor, again separating out the solid matter and cooling the gaseous matter to or below the temperature at which sulphur vapors condense.

3. The process which comprises burning pulverized pyrites in suspension in a controlled atmosphere and autogenetically forming a porous oxide of iron catalytic agent which promotes the reduction to elemental sulphur of the sulphur compounds, the quantity of such autogenetically formed catalyst bearing a more or less fixed ratio to the quantity of pyrites burned and settling out the greater portion of the solid matter and passing the gaseous matter, with the remaining solid matter suspended therein, along with water vapor, and reducing media into a temperature above the condensing temperature of sulphur vapor, again separating out the solid matter and cooling the gaseous matter to or below the temperature at which sulphur vapors condense.

4. The process which comprises burning pulverized pyrites in suspension in a controlled atmosphere containing water vapor and reducing media, and autogenetically forming a porous oxide of iron catalytic agent, which promotes the simultaneous oxidation of the iron and the reduction to elemental sulphur of the sulphur compounds, the quantity of such autogenetically formed catalyst bearing a more or less fixed ratio to the quantity of pyrites burned and settling out the greater portion of the solid matter and passing the gaseous matter, with the remaining solid matter suspended therein, into a reducing atmosphere maintained at a temperature above the condensing temperature of sulphur vapor, again separating out the solid matter and cooling the gaseous matter to or below the temperature at which sulphur vapor condenses.

5. The process which comprises burning pulverized pyrites in suspension in a reaction chamber, within which the atmosphere is so controlled as to temperature, oxygen, and pressure that it promotes the simultaneous oxidation of the iron and the reduction to elemental sulphur of the sulphur compounds, and within which there is autogenetically formed a porous oxide of iron catalytic agent, which is continually sprayed and intimately mixed while still in nascent condition with the burning pyrites particles and gases of combustion and which, by reason of its porosity, intimate mixture, nascent state and other properties still further promotes the rapid and complete oxidation of iron, and reduction to elemental sulphur of sulphur compounds, and which further comprises settling out the greater portion of the solid matter and passing the gaseous matter, with the remaining solid matter suspended therein, into a reducing atmosphere along with water vapor, maintained at a temperature above the condensing temperature of sulphur vapor, again settling out the solid matter and cooling the gaseous matter to or below the temperature at which sulphur vapor condenses.

JEAN McCALLUM.
RICHARD T. SCHRAUBSTADTER.